(12) United States Patent
Hwang et al.

(10) Patent No.: US 11,059,326 B2
(45) Date of Patent: Jul. 13, 2021

(54) RIM FOR NON-PNEUMATIC TIRE AND WHEEL INCLUDING THE SAME

(71) Applicant: Kumho Tire Co., Inc., Gwangju (KR)

(72) Inventors: Soon Wook Hwang, Gwangju (KR); Kee Woon Kim, Gwangju (KR); Chul Woo Kwark, Gwangju (KR); Gwi Seong Shin, Gwangju (KR); Chang Jung Park, Gwangju (KR)

(73) Assignee: KUMHO TIRE CO., INC., Gwangju (KR)

( * ) Notice: Subject to any disclaimer, the term of this patent is extended or adjusted under 35 U.S.C. 154(b) by 365 days.

(21) Appl. No.: 16/176,741

(22) Filed: Oct. 31, 2018

(65) Prior Publication Data

US 2019/0152256 A1    May 23, 2019

(30) Foreign Application Priority Data

Sep. 11, 2017   (KR) .................. 10-2017-0115965

(51) Int. Cl.
| | |
|---|---|
| B60C 7/24 | (2006.01) |
| B60B 25/20 | (2006.01) |
| B60C 7/26 | (2006.01) |
| B60C 7/14 | (2006.01) |
| B60B 25/04 | (2006.01) |
| B60C 7/10 | (2006.01) |
| B60B 23/10 | (2006.01) |

(52) U.S. Cl.
CPC ............... *B60C 7/24* (2013.01); *B60B 25/04* (2013.01); *B60B 25/20* (2013.01); *B60C 7/143* (2013.01); *B60C 7/26* (2013.01); *B60B 23/10* (2013.01); *B60B 25/045* (2013.01); *B60B 2320/10* (2013.01); *B60B 2900/523* (2013.01); *B60C 2007/107* (2013.01); *B60C 2200/04* (2013.01)

(58) Field of Classification Search
CPC .. B60B 9/10; B60B 9/26; B60B 23/10; B60B 25/045; B60B 25/20; B60C 7/10; B60C 7/14; B60C 7/24; B60C 7/26; B60C 2007/146
See application file for complete search history.

(56) References Cited

U.S. PATENT DOCUMENTS

| | | | |
|---|---|---|---|
| 1,455,844 A | 5/1923 | Lang | |
| 9,616,703 B2 * | 4/2017 | Nishida | .................... B60B 1/14 |
| 10,300,743 B2 * | 5/2019 | Abe | ........................ B60C 7/24 |
| 2011/0240193 A1 | 10/2011 | Matsuda et al. | |

FOREIGN PATENT DOCUMENTS

| | | | | |
|---|---|---|---|---|
| JP | 1995-028703 A | 5/1995 | | |
| JP | 1999-139103 A | 5/1999 | | |
| JP | 2017-165159 A | 9/2017 | | |
| WO | WO-9505947 A1 * | 3/1995 | ............ | B60C 27/20 |
| WO | 2016105654 A1 | 6/2016 | | |

* cited by examiner

*Primary Examiner* — Jason R Bellinger
*Assistant Examiner* — Emily G Castonguay
(74) *Attorney, Agent, or Firm* — Saliwanchik, Lloyd & Eisenschenk (57) ABSTRACT

A rim for a non-pneumatic tire comprises a cylindrical rim wall portion, and a fixing member disposed to be spaced apart from the rim wall portion in a radial direction. The rim wall portion is provided with a fixing protrusion protruding in the radial direction or a fixing groove depressed in the radial direction.

11 Claims, 8 Drawing Sheets

RIM FOR NON-PNEUMATIC TIRE AND WHEEL INCLUDING THE SAME

CROSS-REFERENCE TO RELATED APPLICATIONS

This application is based on and claims priority from Korean Patent Application No. 10-2017-0115965, filed on Sep. 11, 2017, the disclosure of which is incorporated herein in its entirety by reference for all purposes.

FIELD OF THE INVENTION

The present disclosure relates to a wheel for a non-pneumatic tire that prevents the non-pneumatic tire from slipping and separating from a surface of a rim.

BACKGROUND OF THE INVENTION

General vehicle tires are classified into several types based on their structures. Most tires for passenger vehicles are radial tires. A radial tire is attached to a rim connected to an axle of a general vehicle, injected with air at an appropriate air pressure, and then used for driving. However, when a pneumatic tire has insufficient internal air pressure, it has difficulty supporting a vehicle load and absorbing impact from the ground, resulting in poor ride comfort. Therefore, a pneumatic tire needs to be maintained regularly.

However, even if a pneumatic tire is maintained regularly, safety issues persist because it is not possible to prevent damage caused by impact or puncture that may occur during driving. In order to solve the above problem, a non-pneumatic tire that does not require air pressure has been developed. A non-pneumatic tire is advantageous in that it is not necessary to maintain air in the tire and thus, problems caused by lack of air pressure during driving do not occur. A non-pneumatic tire is attached to the surface of the rim by a surface adhesive.

However, it is difficult to stably maintain the combination of a non-pneumatic tire and a rim during high-speed driving. Further, when a high rotation force is applied to a wheel, a non-pneumatic tire slips or separates from the rim due to centrifugal force and does not stay fixed to the rim. Accordingly, a non-pneumatic tire does not transmit a rotation force generated from the axle to the ground and may be displaced from the rim, which results in an accident. On the other hand, when an adhesive is excessively applied between a non-pneumatic tire and a rim, it is difficult to remove the non-pneumatic tire from the rim due to excessive adhesion, which makes it difficult to replace the non-pneumatic tire.

SUMMARY OF THE INVENTION

In view of the above, the present disclosure provides a rim capable of stably fixing a non-pneumatic tire, and a wheel including the same. The present disclosure also provides a rim that allows a non-pneumatic tire to be easily removed at the time of replacing a non-pneumatic tire, and a wheel including the same.

In accordance with an aspect, there is provided a rim for a non-pneumatic tire, comprising: a cylindrical rim wall portion; and a fixing member disposed to be spaced apart from the rim wall portion in a radial direction.

The rim wall portion may be provided with at least one of a fixing protrusion protruding in the radial direction and a fixing groove depressed in the radial direction.

The rim for a non-pneumatic tire may further comprise: a rim flange portion that protrudes from the rim wall portion in the radial direction and is connected to the rim wall portion at one side in an axial direction.

The rim flange portion may be detachably connected to the rim wall portion, and the rim may further comprise: a fastening unit for fixing the rim flange portion to the rim wall portion, wherein the fastening unit includes: first fastening holes formed at a side surface of the rim flange portion to penetrate therethrough in the axial direction; second fastening holes formed at a side surface of the rim wall portion in the axial direction; and fastening pins inserted through the first fastening holes into the second fastening holes to fix the rim flange portion to the rim wall portion.

The fixing member may include at least one of a recess depressed on a surface facing the rim wall portion and a protrusion protruding from the surface facing the rim wall portion.

The rim flange portion may include a first rim flange portion connected to the rim wall portion at one side in the axial direction and a second rim flange portion connected to the rim wall portion at the other side in the axial direction, the recess and the protrusion have a predetermined length along the axial direction, and the predetermined length of the recess and the protrusion is smaller than or equal to a distance between the first rim flange portion and the second rim flange portion.

The rim for a non-pneumatic tire may further comprise: a locking unit for fixing the fixing member to the rim flange portion, wherein the locking unit includes: first locking holes formed at the fixing member to penetrate therethrough in the radial direction; second locking holes formed at a circumferential surface of the rim flange portion in the radial direction; and locking pins inserted through the first locking holes into the second locking holes to fix the fixing member to the rim flange portion.

The non-pneumatic tire may include an insertion hole, the rim flange portion is provided with a hole into which the fixing member inserted into the insertion hole is accommodated, and the locking pins are inserted into the first locking holes and the second locking holes in a state where the fixing member is inserted into the hole.

In accordance with another aspect, there is provided a wheel comprising: the rim described above, and a non-pneumatic tire coupled to the rim, wherein the non-pneumatic tire includes: an inner band coupled to the rim; an outer band that is spaced apart from the inner band and covers an outer peripheral surface of the inner band; and a spoke radially extending between the inner band and the outer band, wherein an insertion hole extending in an axial direction is formed at any one of the inner band and the spoke, and the fixing member of the rim is inserted into the insertion hole of the non-pneumatic tire.

The insertion hole may be brought into contact with a radially outer surface of the fixing member.

A thickness of the inner band in the radial direction may be greater than a protruding length of the rim flange portion from the rim wall portion in the radial direction.

A thickness of the inner band in the radial direction may be smaller than a protruding length of the rim flange portion from the rim wall portion in the radial direction.

A thickness of the inner band in the radial direction may be equal to a protruding length of the rim flange portion from the rim wall portion in the radial direction.

In accordance with the embodiments of the present disclosure, the non-pneumatic tire can be stably fixed to the rim.

Further, the non-pneumatic tire can be easily removed from the rim at the time of replacing the non-pneumatic tire.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Hereinafter, specific embodiments for implementing the idea of the present disclosure will be described in detail with reference to the accompanying drawings.

In describing the present disclosure, detailed descriptions of known configurations or functions that make the present disclosure obscure may be omitted.

When it is said that a component is "connected" or "linked" to another component, it should be understood that the former component may be directly connected or linked to the latter component or a third component may be interposed between the two components.

Specific terms used in the present application are used simply to describe specific embodiments without limiting the present disclosure. An expression used in the singular encompasses the expression of the plural, unless it has a clearly different meaning in the context.

It should be noted that like parts are designated by like reference numerals throughout the accompanying drawings. Further, detailed description of known configurations or functions that make the present disclosure obscure will be omitted. For the same reason, some components in the accompanying drawings are exaggerated, omitted or schematically illustrated, and the size of each component does not exactly reflect its actual size.

In the following description, the term "radial direction r" means a radial direction of the tire, the term "axial direction a" means a direction perpendicular to the radial direction and in parallel to a rotational axis of the tire. The axial direction does not necessarily pass through the center of the rotation axis of the tire and includes a direction in parallel to a rotation axis direction of the tire. The term "circumferential direction c" means a direction along an outer circumferential surface of the tire that is perpendicular to the radial direction. The circumferential direction may be a clockwise direction or a counterclockwise direction when viewed from one side of the tire. The above directions include both a positive direction and a negative direction, unless particularly mentioned.

Figure 1:
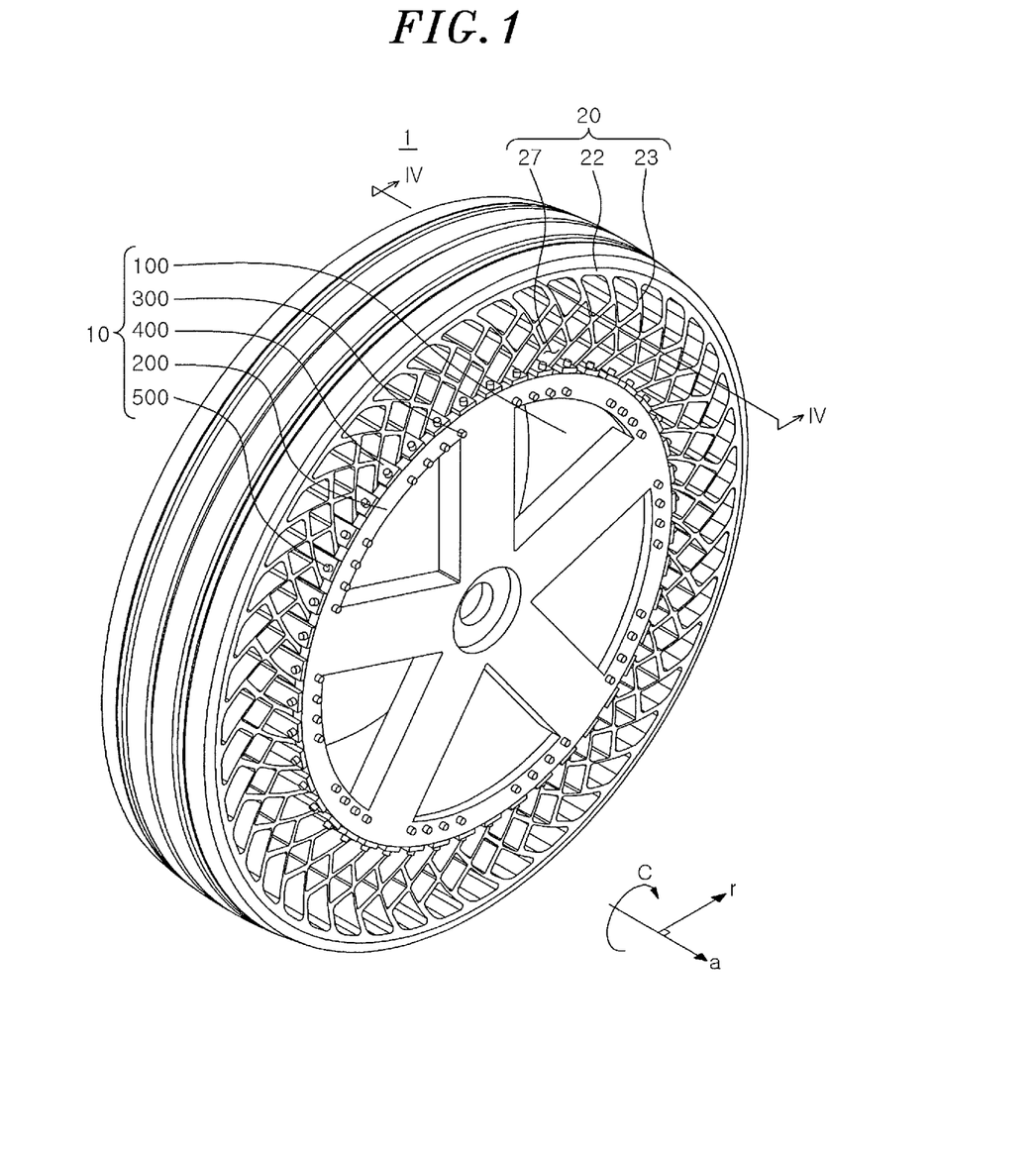
FIG. 1 is a perspective view of a wheel including a rim according to a first embodiment of the present disclosure.
Figure 2:
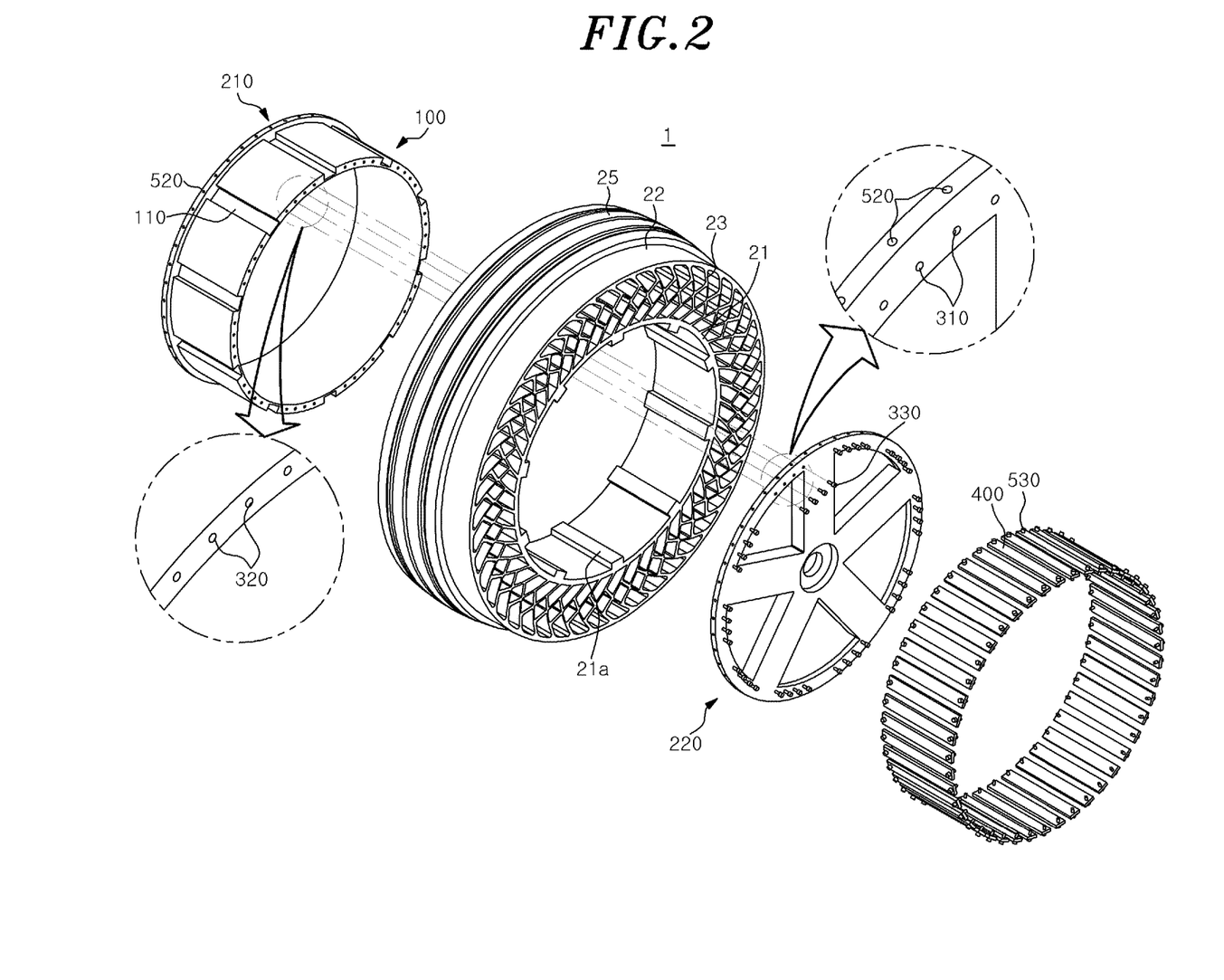
FIG. 2 is an exploded perspective view of the wheel shown in FIG. 1.
Figure 3:
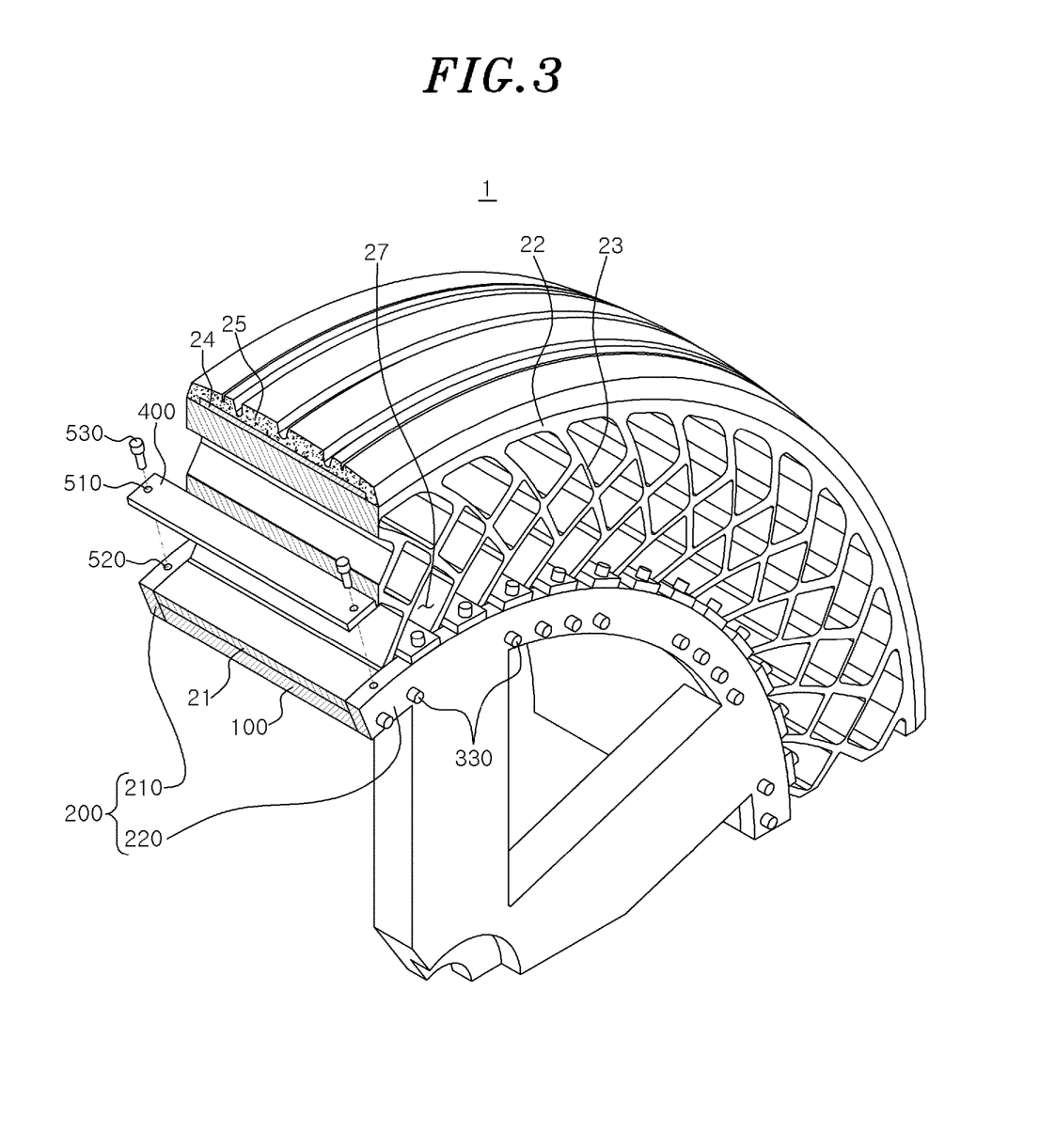
FIG. 3 is a cross sectional perspective view of the wheel shown in FIG. 1.
Figure 4:
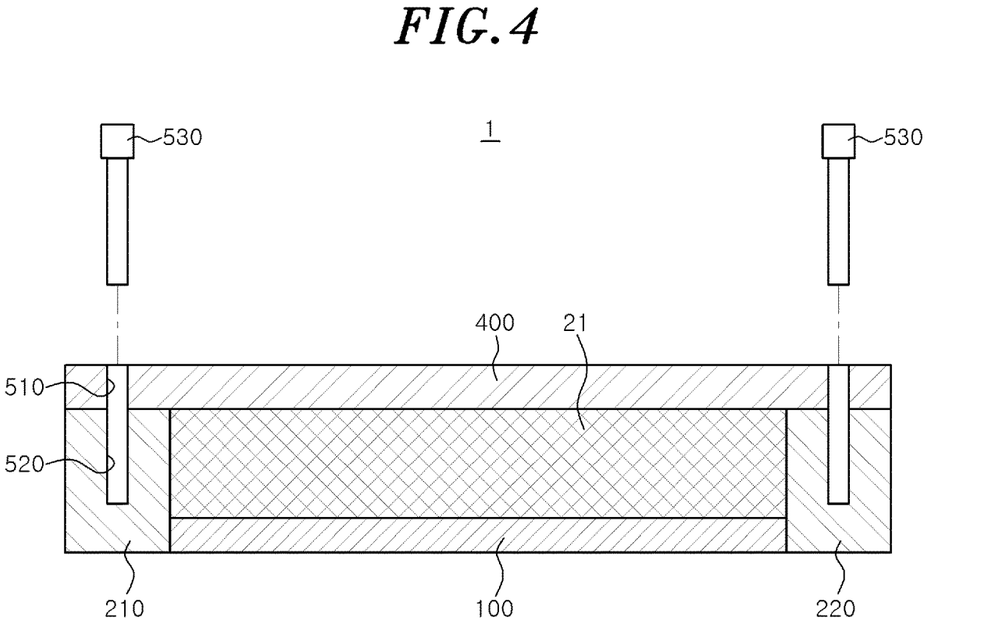
FIG. 4 is a cross sectional view taken along a line IV-IV of FIG. 1.

Referring to FIG. 1, a wheel 1 may include a rim 10 connected to an axle of a vehicle, and a non-pneumatic tire 20 fixed to the rim 10. The non-pneumatic tire 20 is connected to the rim 10 and supports the weight of a vehicle and a live load if any. Further, the non-pneumatic tire 20 can transmit a driving force and a braking force to the road while driving, and absorb or reduce the impact transmitted from the road. Hereinafter, the rim 10 according to a first embodiment of the present disclosure and the wheel including the rim will be described with reference to FIGS. 1 to 4.

Referring to FIGS. 1 to 4, the rim 10 may include: a rim wall portion 100 connected to an axle of a vehicle or the like and provided on an inner peripheral side of the non-pneumatic tire; a rim flange portion 200 protruding in a radial direction from the rim wall portion 100; a fastening unit 300 for detachably fixing the rim flange portion 200; a fixing member 400 that is detachably fixed to the rim wall portion 100 and supports the non-pneumatic tire 20; and a locking unit 500 for detachably fixing the fixing member 400 to the rim flange portion 200.

The rim wall portion 100 has a cylindrical shape and can be coupled with an inner peripheral surface of the non-pneumatic tire 20. A tire fixing part 110 that can be engaged with the inner peripheral surface of the non-pneumatic tire 20 may be formed at an outer peripheral surface of the rim wall portion 100. Further, the tire fixing part 110 can extend from one end toward the other end in an axial direction "a." In the drawings according to the present embodiment, the tire fixing part 110 is a fixing groove depressed inward in the radial direction "r." However, the tire fixing part 110 is not limited thereto, and may be a fixing protrusion protruding outward in a radial direction "r." The rim wall portion 100 may have various shapes corresponding to the shape of the inner peripheral surface of the non-pneumatic tire 20.

The rim flange portion 200 protrudes in the radial direction "r" from the rim wall portion 100 and can be detachably coupled with the rim wall portion 100 at one side or both sides in the axial direction "a." The rim flange portion 200 can cover the rim wall portion 100 at both sides in the axial direction "a."

The rim flange portion 200 may have a circular shape when viewed in the axial direction "a," and may have a radius greater than that of the rim wall portion 100. When viewed in a cross section perpendicular to a circumferential direction "c," the rim flange portion 200 can protrude in the radial direction "r" from the rim wall portion 100 by a thickness in the radial direction "r" of an inner band 21 to be described later.

A plurality of rim flange portions 200 may be provided. Among the plurality of rim flange portions 200, a first rim flange portion 210 can be connected to the rim wall portion 100 at one side in the axial direction "a," and a second rim flange portion 220 can be connected to the rim wall portion 100 at the other side in the axial direction "a." When viewed in the cross section perpendicular to the circumferential direction "c," the non-pneumatic tire 20 can be disposed between the first flange portion 210 and the second flange portion 220. In other words, the rim flange portion 200 can provide a space for accommodating the non-pneumatic tire 20, together with the rim wall portion 100. When the non-pneumatic tire 20 is accommodated in the space, the inner surface of the rim flange portion 200 can be brought into contact with the outer surface of the non-pneumatic tire 20.

A plurality of fastening units 300 may be provided to detachably fix the rim flange portion 200 to the side surface of the rim wall portion 100. For example, the fastening unit 300 may include first fastening holes 310 formed at the rim flange portion 200, second fastening holes 320 formed at the rim wall portion 100, and fastening pins 330 to be inserted through the first fastening holes 310 into the second fastening holes 320.

The first fastening holes 310 can be formed at the side surface of the rim flange portion 200 to penetrate through the rim flange portion 200 in the axial direction "a." The second fastening holes 320 can be formed at the side surface of the rim wall portion 100 in the axial direction "a" and disposed at positions corresponding to the first fastening holes 310. Female threads can be formed at inner surfaces of at least one of the first fastening holes 310 and the second fastening holes 320. The fastening pins 330 are inserted into the second fastening holes 320 through the first fastening holes 310, thereby fixing the rim flange portion 200 to the rim wall portion 100. Male threads can be formed at the outer surfaces of the fastening pins 330 to be engaged with the female threads of the first fastening holes 310 and the second fastening holes 320.

The fixing member 400 may be a plate extending in the axial direction "a." The length of the fixing member 400 in the axial direction "a" may be greater than the distance between the first rim flange portion 210 and the second rim flange portion 220. The fixing member 400 may be spaced apart from the rim wall portion 100 by a predetermined distance in the radial direction "r." The predetermined distance may be equal to the thickness of the inner band 21 in the radial direction "r." The rim wall portion 100 may be detachably connected to the rim flange portion 200 such that it is supported by the rim flange portion 200 at one end and the other end in the axial direction "a." When the fixing member 400 is fixed to the rim flange portion 200, the surface of the fixing member 400 that faces the rim wall portion 100 may be in contact with the inner surface of the insertion hole 27 in the radial direction "r" and the circumferential surface of the rim flange portion 200, and the inner surfaces of the insertion holes 27 in the radial direction "r" may be the outer peripheral surface of the inner band 21. The inner surface of the fixing member 400 in the radial direction "r" may have substantially the same curvature as that of the rim flange portion 200. In that case, the fixing member 400 itself may be bent.

A plurality of fixing members 400 may be provided at a predetermined interval along the circumferential direction "c."

The locking unit 500 can detachably fix the fixing member 400 to the outer peripheral surface of the rim flange portion 200. For example, the locking unit 500 may include first locking holes 510 formed at the fixing member 400, second locking holes 520 formed at the outer peripheral surface of the rim flange portion 200, and locking pins 530 inserted through the first locking holes 510 into the second locking holes 520.

The first locking holes 510 may be formed at the fixing member 400 to penetrate therethrough in the radial direction "r." The second locking holes 520 may be formed at the outer peripheral surface of the rim flange portion 200 in the radial direction "r" and disposed at positions corresponding to the first locking holes 510 of the fixing member 400. Female threads can be formed at inner surfaces of at least one of the first locking holes 510 and second locking holes 520. The locking pins 530 are inserted through the first locking holes 510 into the second locking holes 520, thereby fixing the fixing member 400 to the rim flange portion 200. Male threads can be formed at the locking pins 530 to be engaged with the female threads of the first locking holes 510 and the second locking holes 520.

The locking unit 500 may be provided on one side and the other side in the axial direction "a" of the fixing member 400. A plurality of locking units 500 may be provided to correspond to the number of fixing members 400. For example, if it is configured that two locking units 500 fix one fixing member 400 at both sides in the axial direction "a" and there are provided ten fixing members 400, there may be provided twenty locking units 500. Further, the locking units 500 may be disposed between the fastening units 300 along the circumferential direction "c."

The rim 10 configured as described above can fix the non-pneumatic tire 20 on the outer peripheral side. Hereinafter, the non-pneumatic tire 20 will be described.

The non-pneumatic tire 20 may include: an inner band 21 that can be coupled with the rim 10 on the inner peripheral surface thereof; an outer band 22 that is spaced apart from the inner band 21 and covers the outer peripheral surface of the inner band 21; a spoke 23 provided between the outer band 22 and the inner band 21; a shear band 24 surrounding the outer peripheral surface of the outer band 22; a tread 25 surrounding the outer peripheral surface of the shear band 24; and insertion holes 27 into which the fixing members 400 of the rim 10 are inserted.

The inner band 21 may have a shape corresponding to the shape of the rim 10. A rim locking portion 21a to be engaged with the tire fixing part 110 of the rim 100 may be formed at the inner peripheral surface of the inner band 21. The rim locking portion 21a can extend from one end toward the other end in the axial direction "a." In the drawing according to the present embodiment, the tire fixing part 110 is a fixing groove, and the rim locking portion 21a is a protrusion protruding inward in the radial direction "r." However, the rim locking portion 21a is not limited thereto, and can prevent the non-pneumatic tire 20 from being slipped as long as it has a shape corresponding to the tire fixing part 110. Therefore, when the tire fixing part 110 is a fixing protrusion protruding outward in the radial direction "r," the rim locking portion 21a may be a groove depressed outward in the radial direction "r."

The outer band 22 can surround the inner band 21 while being spaced apart from the inner band 21 by a predetermined distance. In other words, the radially inner peripheral surface of the outer band 22 and the radially outer peripheral surface of the inner band 21 can face each other. The outer band 22 and the inner band 21 can be connected by the spoke 23.

The spoke 23 can be provided between the inner band 21 and the outer band 22. The spoke 23 can serve as a support for connecting the inner band 21 and the outer band 22. Further, the spoke 23 can serve as a buffering material that distributes and absorbs impact applied to the non-pneumatic tire 20 and can support a load of a vehicle to which the non-pneumatic tire 20 is coupled. A plurality of spokes 23 may be provided. The spokes 23 can extend along the axial direction "a" and form a predetermined pattern between the inner band 21 and the outer band 22 when viewed in the axial direction "a." However, the present disclosure is not limited thereto. In another example, the spokes 23 can extend in the circumferential direction "c" and form a predetermined pattern when viewed in the circumferential direction "c."

The shear band 24 can primarily reduce the initial stress acting on the non-pneumatic tire 20. The shear band 24 can be formed in one or more layers made of a composite material containing a carbon fiber or a steel cord. For example, the shear band 24 can be formed in one or more layers made of CFRP (Carbon Fiber Reinforced Plastic) or a steel cord belt used for a pneumatic tire.

The tread 25 may be provided on the radially outer peripheral surface of the shear band 24. The tread 25 is disposed on the outermost side of the non-pneumatic tire 20 and can make direct contact with the ground. As for the tread 25, it is possible to employ various treads that are commonly used in this field.

The insertion holes 27 can provide spaces for inserting the fixing members 400 into the non-pneumatic tire 20 along the axial direction "a." By the fixing members 400 making contact with at least the inner surface of the insertion hole 27 in the radial direction "r," and due to the deformation of the non-pneumatic tire 20 in the axial direction "a," the non-pneumatic tire 20 can be prevented from separating or slipping from the rim 10.

The insertion holes 27 can be defined by the spokes 23. In other words, the plurality of spokes 23 extending along the axial direction "a" can be arranged at a predetermined interval along the circumferential direction "c." The spaces between the spokes 23 can become the insertion holes 27. The fixing members 400 can fix the non-pneumatic tire 20 by making contact with the inner side of the insertion holes 27 in the radial direction "r."

In accordance with the first embodiment, since the non-pneumatic tire 20 and the rim 10 are structurally fastened without using an adhesive or fastening material, the non-pneumatic tire can be removed. In addition, the non-pneumatic tire 20 can be prevented from slipping or separating from the rim 10, and the rotation force of the rim 10 can be transmitted to the non-pneumatic tire without loss. Further, it is possible to improve a tire's load carrying capacity, load impact absorbing capacity, and responsivity to driving, including driving, stopping, and changing directions.

In the first embodiment, the radially inner surface of the fixing member 400 is flat. However, in accordance with a first modification and a second modification to be described later, a recess or a protrusion may be formed at the fixing member 400. Hereinafter, differences between the first embodiment and the first and second modification will be mainly described with reference to FIGS. 5 and 6. Further, like reference numerals will be given to like parts and redundant description thereof will be omitted.

Figure 5:
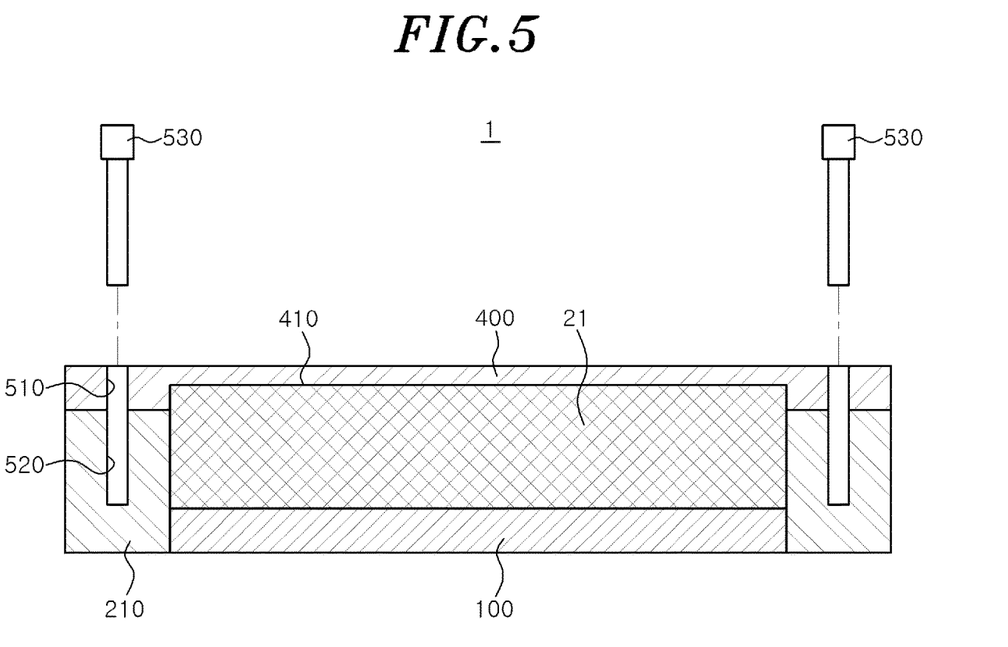
FIG. 5 is a cross sectional view showing a first modification of the first embodiment of the present disclosure.

As shown in FIG. 5, in accordance with the first modification of the first embodiment, a recess 410 may be formed at the inner surface of the fixing member 400 in the radial direction "r." The recess 410 can extend along the circumferential direction "c." In other words, the fixing member 400 can protrude inward in the radial direction "r" at both sides in contact with the rim flange portion 200. The length of the recess 410 in the axial direction "a" may be equal to or smaller than the distance between the first rim flange portion 210 and the second rim flange portion 220.

Figure 6:
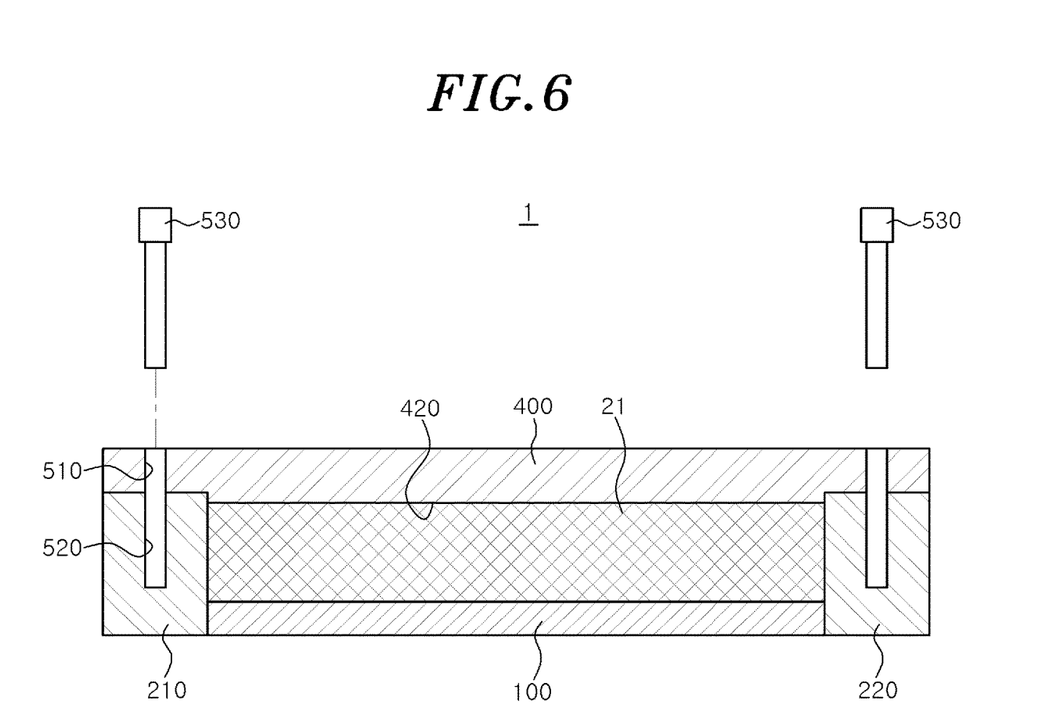
FIG. 6 is a cross sectional view showing a second modification of the first embodiment of the present disclosure.
Figure 7:
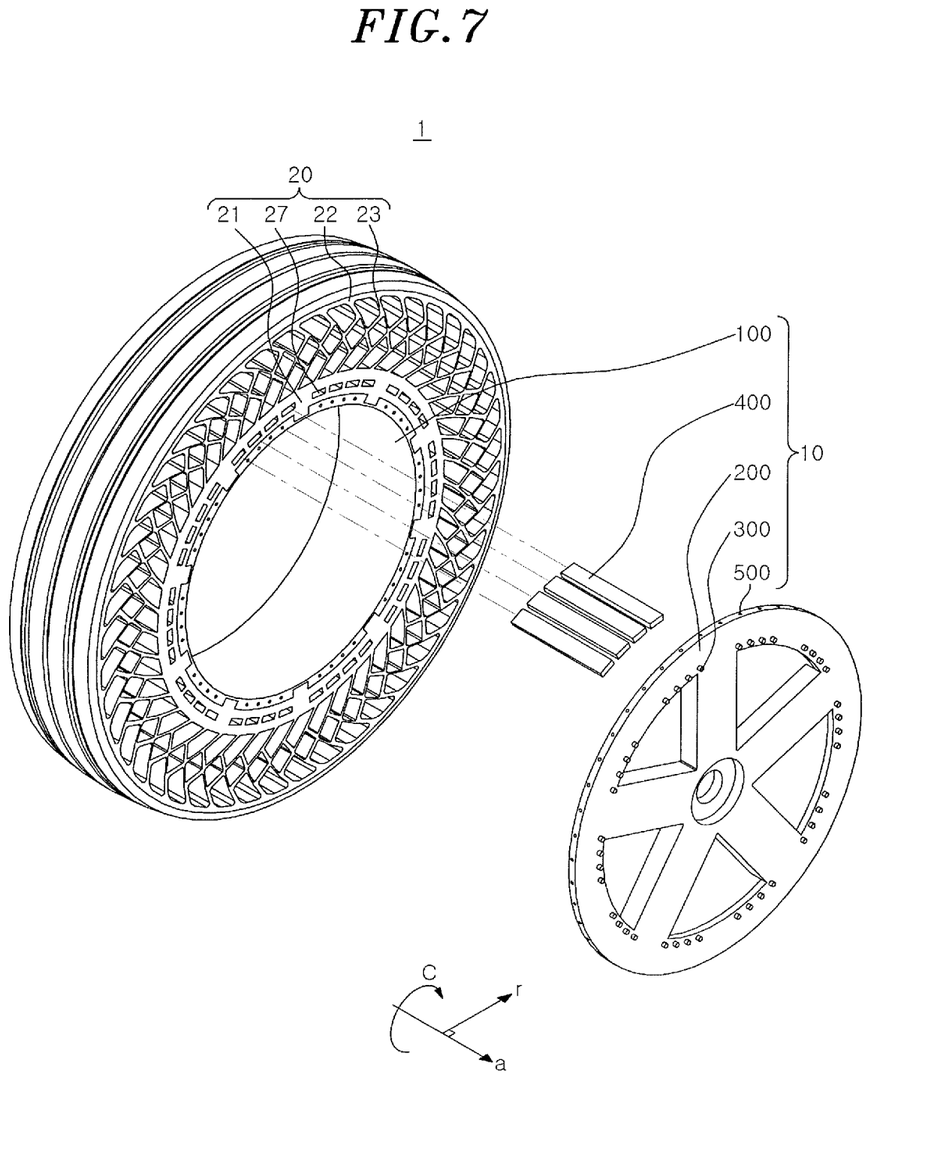
FIG. 7 is an exploded perspective view of a wheel including a rim according to a second embodiment of the present disclosure.

As shown in FIG. 6, in accordance with the second modification of the first embodiment, a protrusion 420 may be formed at the inner surface of the fixing member 400 in the radial direction "r." The protrusion 420 can extend along the circumferential direction "c." In other words, the fixing member 400 can be depressed outward in the radial direction "r" at both sides in contact with the rim flange portion 200. The length in the axial direction "a" of the protrusion 420 may be equal to or smaller than the distance between the first rim flange portion 210 and the second rim flange portion 220.

In the first embodiment, the insertion holes 27 are defined by the spokes 23. However, in accordance with a second embodiment to be described below, the insertion holes 27 can be formed at the inner band 21. Hereinafter, differences between the first embodiment and the second embodiment will be mainly described with reference to FIGS. 7 to 10. Further, like reference numerals will be given to like parts and redundant description thereof will be omitted.

As shown in FIGS. 7 to 10, in accordance with the second embodiment, a hole 201 into which the fixing member 400 is inserted in the axial direction "a" can be formed at the rim flange portion 200 in the axial direction "a." The hole 201 can be formed at the first rim flange portion 210 and the second rim flange portion 220. Further, the hole 201 may have a shape corresponding to that of the end portion of the fixing member 400 to accommodate the end portion of the fixing member 400. The insertion hole 27 can be formed at the inner band 21 in a shape corresponding to that of the fixing member 400. In other words, the insertion hole 27, the hole 201, and the fixing member 400 may have the same shape when viewed in the axial direction "a." Therefore, the outer surface of the fixing member 400 is brought into close contact with the inner surface of the hole 201. Accordingly, the non-pneumatic tire 20 can be more stably fixed. Among the holes 201 formed at the first rim flange portion 210 and the second rim flange portion 220, at least one may be a through hole.

In a state where the fixing members 400 are inserted into the holes 201 and the insertion holes 27, the locking pins 530 are inserted into the first locking holes 510 of the fixing member 400 and the second locking holes 520 of the rim wall portion 100, thereby fixing the fixing member 400.

In accordance with the present embodiment, the fixing members 400 can be inserted into the insertion holes 27 formed at the non-pneumatic tire 20 after the non-pneumatic tire 20 is engaged with the rim 10. Both end portions of the fixing members 400 inserted into the insertion holes 27 can protrude from the non-pneumatic tire 20 when viewed in the radial direction "r." Then, the rim flange portion 200 can be connected to the rim wall portion 100 to cover the rim wall portion 100 at both sides in the axial direction "a." At this time, the protruded end portions of the fixing members 400 can be accommodated in the holes 201 formed at the rim flange portion 200. The inserted fixing members 400 can be fixed to the rim flange portion 200 by the locking pins 530.

In the present embodiment and the drawings thereof, the hole 201 is a groove, and the rim flange portion 200 is coupled to the rim wall portion 100 after the fixing members 400 are inserted into the insertion holes 27. However, the present disclosure is not necessarily limited thereto. In another example, the hole 201 may be a through hole extending along the axial direction "a," and the fixing members 400 can be inserted through the holes 201 into the insertion holes 27 after the rim flange portion 200 is coupled to the rim wall portion 100.

Figure 8:
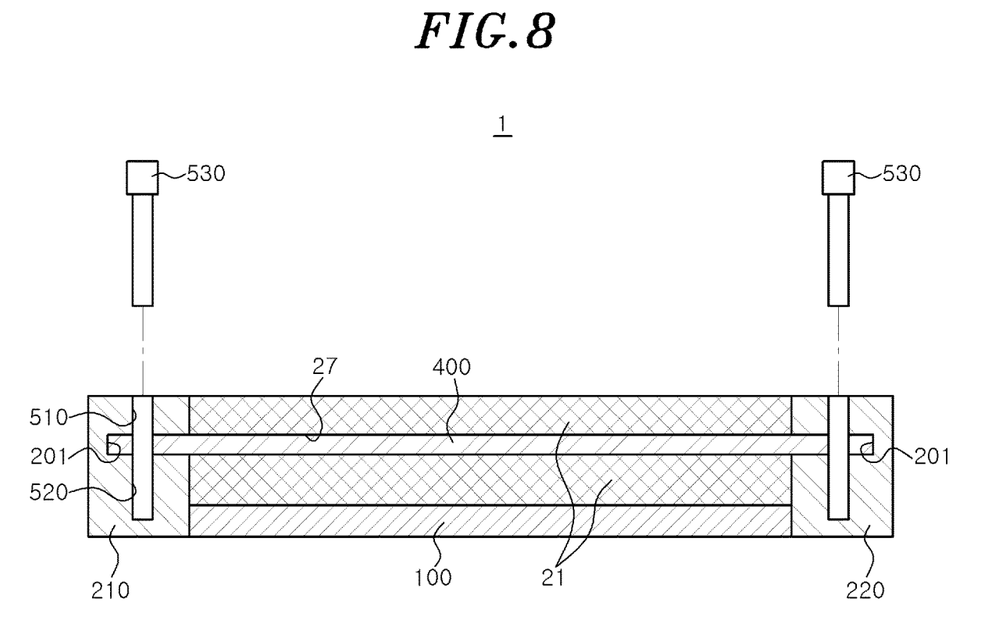
FIG. 8 is a cross sectional view of the wheel including the rim according to the second embodiment of the present disclosure.
Figure 9:
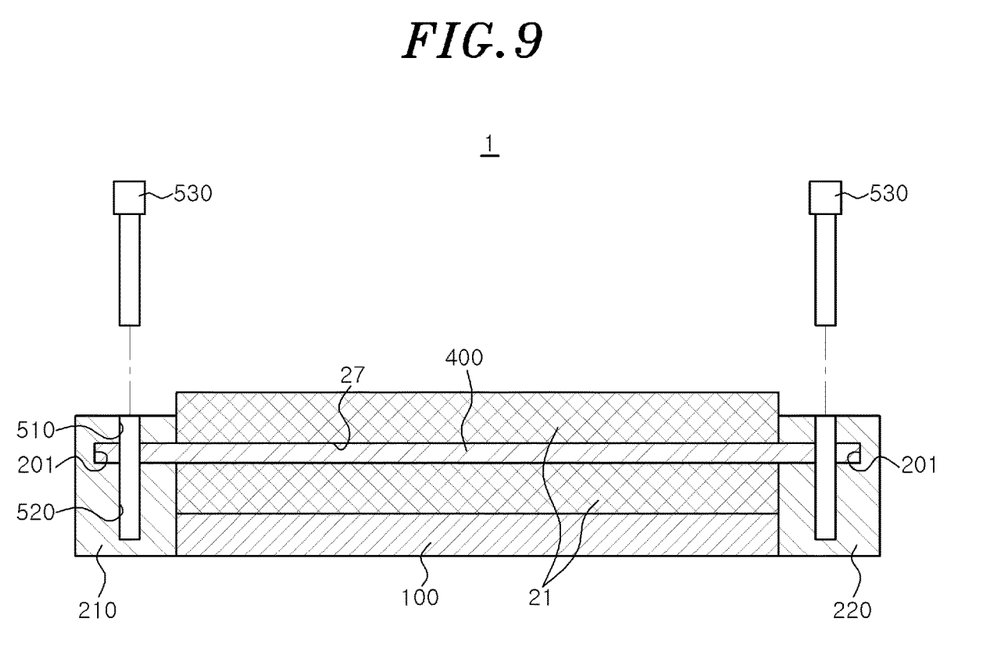
FIG. 9 is a cross sectional view showing another example of the wheel according to the second embodiment.
Figure 10:
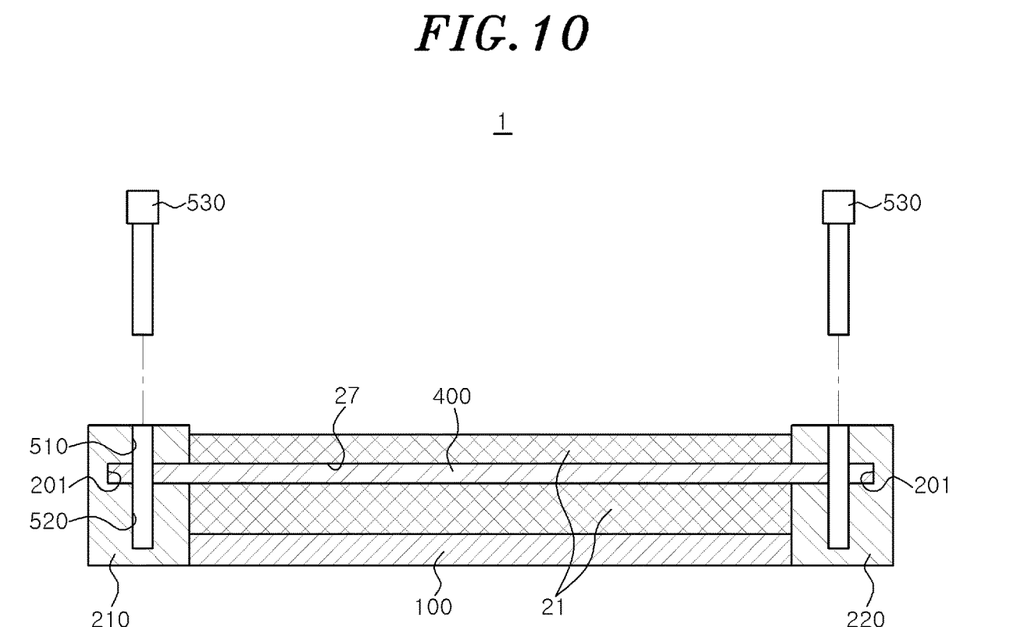
FIG. 10 is a cross sectional view showing still another example of the wheel according to the second embodiment.

The inner band 21 fixed by the fixing members 400 may not protrude or may not be depressed from the rim flange portion 200. In other words, the thickness of the inner band 21 in the radial direction "r" may be equal to the protruding length of the rim flange portion 200 from the rim wall portion 100 in the radial direction "r." However, the idea of the present disclosure is not necessarily limited thereto, and the inner band 21 may protrude or may be depressed from the rim flange portion 200. In other words, in another example, the thickness of the inner band 21 in the radial direction "r" may be greater than the protruding length of the rim flange portion 200 from the rim wall portion 100 in the radial direction "r" (see FIG. 9). In still another example, the thickness of the inner band 21 in the radial direction "r" may be smaller than the protruding length of the rim flange portion 200 from the rim wall portion 100 in the radial direction "r" (see FIG. 10).

In accordance with the present embodiment, since the non-pneumatic tire 20 supports the fixing members 400 in the axial direction "a," it is possible to stably withstand the force applied in the radial direction "r" of the non-pneumatic tire 20. Therefore, it is possible to prevent the non-pneumatic tire 20 from slipping or separating from the rim 10 even during high-speed driving, and also possible to prevent the fastening unit 300 and the locking unit 500 from being damaged by the force applied to the non-pneumatic tire 20 in the radial direction "r."

Although the specific embodiments of the rim for a non-pneumatic tire according to the embodiment of the present disclosure and the wheel including the same have been described, they are merely examples. The present disclosure is not limited thereto and should be interpreted broadly according to the basic idea disclosed in this specification. Those skilled in the art may implement patterns of shapes that are not indicated by combining and replacing the disclosed embodiments within a range, not departing from the scope of the present disclosure. In addition, those skilled in the art may easily change and modify the disclosed embodiments based on this specification, and it will be apparent that such changes or modifications are within the scope of the present disclosure.

What is claimed is:

1. A rim for a non-pneumatic tire, comprising:
a cylindrical rim wall portion;
a fixing member disposed to be spaced apart from the rim wall portion in a radial direction;
a rim flange portion that protrudes from the rim wall portion in the radial direction and is connected to the rim wall portion at one side in an axial direction; and
a locking unit for fixing the fixing member to the rim flange portion,
wherein the locking unit comprises:
first locking holes formed at the fixing member to penetrate therethrough in the radial direction;
second locking holes formed at a circumferential surface of the rim flange portion in the radian direction; and
locking pins inserted through the first locking holes into second locking holes to fix the fixing member to the rim flange portion.

2. The rim for a non-pneumatic tire of claim 1, wherein the rim wall portion is provided with at least one of a fixing protrusion protruding in the radial direction and a fixing groove depressed in the radial direction.

3. The rim for a non-pneumatic tire of claim 1, wherein the rim flange portion is detachably connected to the rim wall portion,
the rim further comprising:
a fastening unit for fixing the rim flange portion to the rim wall portion,
wherein the fastening unit includes:
first fastening holes formed at a side surface of the rim flange portion to penetrate therethrough in the axial direction;
second fastening holes formed at a side surface of the rim wall portion in the axial direction; and
fastening pins inserted through the first fastening holes into the second fastening holes to fix the rim flange portion to the rim wall portion.

4. The rim for a non-pneumatic tire of claim 1, wherein the fixing member includes at least one of a recess depressed on a surface facing the rim wall portion and a protrusion protruding from the surface facing the rim wall portion.

5. The rim for a non-pneumatic tire of claim 4, wherein the rim flange portion includes a first rim flange portion connected to the rim wall portion at one side in the axial direction and a second rim flange portion connected to the rim wall portion at the other side in the axial direction,
the recess and the protrusion have a predetermined length along the axial direction, and
the predetermined length of the recess and the protrusion is smaller than or equal to a distance between the first rim flange portion and the second rim flange portion.

6. The rim for a non-pneumatic tire of claim 1, wherein the non-pneumatic tire includes an insertion hole,
the rim flange portion is provided with a hole into which the fixing member inserted into the insertion hole is accommodated, and
the locking pins are inserted into the first locking holes and the second locking holes in a state where the fixing member is inserted into the hole.

7. A wheel comprising:
a rim, and
a non-pneumatic tire coupled to the rim,
wherein the rim includes:
a cylindrical rim wall portion:
a fixing member disposed to be spaced apart wall port in a radial direction;
a rim flange portion that protrudes from the rim wall portion in the radial direction and is connected to the rim wall portion at one side in an axial direction; and
a locking unit for fixing the fixing member to the rim flange portion,
wherein the locking unit comprises:
first locking holes formed at the fixing member to penetrate therethrough in the radial direction;
second locking holes formed at a circumferential surface of the rim flare portion in the radial direction; and
locking pins inserted through the first locking holes into the second locking holes to fix the fixing member to the rim flange portion,
wherein the non-pneumatic tire comprises:
an inner band coupled to the rim;
an outer band that is spaced apart from the inner hand and covers an outer peripheral surface of the inner band; and
a spoke radially extending between the inner band and the outer band,
wherein an insertion hole extending in an axial direction is formed at any one of the inner band and the spoke, and
the fixing member of the rim is inserted into the insertion hole of the non-pneumatic tire.

8. The wheel of claim 7, wherein the insertion hole is brought into contact with a radially outer surface of the fixing member.

9. The wheel of claim 7, wherein a thickness of the inner band in the radial direction is greater than a protruding length of the rim flange portion from the rim wall portion in the radial direction.

10. The wheel of claim 7, wherein a thickness of the inner band in the radial direction is smaller than a protruding length of the rim flange portion from the rim wall portion in the radial direction.

11. The wheel of claim 7, wherein a thickness of the inner band in the radial direction is equal to a protruding length of the rim flange portion from the rim wall portion in the radial direction.

\* \* \* \* \*